United States Patent [19]

Stanton et al.

[11] 4,009,361
[45] Feb. 22, 1977

[54] ELECTRICAL DISCHARGE MACHINING APPARATUS WITH MONITORING CIRCUIT AND MEANS TO CHECK THE OPERABILITY OF THE MONITORING CIRCUIT

[75] Inventors: Anthony Howard Stanton; Peter Laurence Taylor, both of Wetherby, England

[73] Assignee: Sparcatron Limited, England

[22] Filed: Dec. 4, 1974

[21] Appl. No.: 529,508

[30] Foreign Application Priority Data

Dec. 12, 1973 United Kingdom ............ 56184/73
May 23, 1974 United Kingdom ............ 23145/74

[52] U.S. Cl. ..................................... 219/69 C
[51] Int. Cl.[2] ..................................... B23P 1/08
[58] Field of Search ............ 219/69 C, 69 G, 69 M, 219/69 S

[56] References Cited

UNITED STATES PATENTS

| | | | |
|---|---|---|---|
| 2,871,410 | 1/1959 | Matulaitis | 219/69 S X |
| 2,987,609 | 6/1961 | Williams et al. | 219/69 C |
| 3,301,776 | 1/1967 | Hughes | 219/69 C |
| 3,539,753 | 11/1970 | Ullmann et al. | 219/69 C |
| 3,623,148 | 11/1971 | Benghauser | 219/69 C |
| 3,624,337 | 11/1971 | Kauffman | 219/69 P |
| 3,673,371 | 6/1972 | Smith | 219/69 G |
| 3,746,930 | 7/1973 | Van Best et al. | 219/69 G |
| 3,864,541 | 2/1975 | Inoue | 219/69 C |
| 3,875,374 | 4/1975 | Inoue | 219/69 C |

*Primary Examiner*—Bruce A. Reynolds
*Attorney, Agent, or Firm*—Shoemaker and Mattare, Ltd.

[57] ABSTRACT

A circuit for controlling an EDM process in which a logical monitoring circuit is used to detect a wrong discharge pulse out of the simultaneous occurrence and absence of certain electrical characteristics in the electrical discharge, as for example the absence of a high frequency component on the discharge voltage, as a criterion for an arc condition, the circuit including an input device connected to supply test signals to the monitoring circuit to simulate a wrong discharge pulse and thus enable checking of the monitoring circuit.

9 Claims, 9 Drawing Figures

ELECTRICAL DISCHARGE MACHINING APPARATUS WITH MONITORING CIRCUIT AND MEANS TO CHECK THE OPERABILITY OF THE MONITORING CIRCUIT

The present invention relates to electrical discharge machining, commonly known in the art as EDM. The invention relates to a well known problem in EDM of detecting "arc" or "burn" conditions. The invention provides a monitoring apparatus in EDM wherein a monitoring is made on a per pulse basis, of detecting a high frequency component in the energy discharge across the gap between a tool electrode and a workpiece, said high frequency component having a frequency in excess of four times the discharge pulse frequency. Moreover, the invention provides a means of monitoring an EDM operation in which the step is taken to detect whether such a high frequency component exists in the energy discharge across the gap and modifying the machining operation accordingly. The invention particularly relates to a means connected with the monitoring circuit to supply test signals to the monitoring circuit to simulate a wrong discharge pulse and thus enable checking of the monitoring circuit.

Prior proposals have been made for indicating fault conditions that may occur in electrical discharge machining.

Some proposals, for example, see U.S. Pat. No. 3,018,411, have monitored voltage at the discharge gap. Other proposals, for example, see U.S. Pat. No. 3,178,551, have monitored current at the discharge gap.

A particular difficulty has been found, when the fault condition is an arc condition (sometimes known as a burn condition), to identify this condition.

British Patent Specification No. 1 128 452 refers to the detection of arc conditions but in fact goes on to describe detection of a short-circuit tendency existing in the discharge gap. This does often precede some arc conditions which can thereby be detected by this method, but does not precede all arc conditions so that there are others which cannot be so detected.

Other prior literature indicates that attempts have been made to distinguish an arc condition from a machining discharge condition by a slight difference in the voltage at the gap in the respective conditions. However, this was very unreliable, both because the difference is so slight and because both voltages may vary even in a single discharge.

A further proposal which was made by the present applicants in 1970 (British Patent Specification No. 1 281 606, West German Specification No. G 7 113 974, French Patent Specification No. 2 089 601, and U.S. Pat. No. 3,673,371), identified an arc condition by detecting when a build-up of sediment or other interfering material in the gap between the tool electrode and the workpiece, caused a servo system, controlling the retraction of the tool electrode, to retract this electrode more than a predetermined amount. However, this did not indicate the arc condition until a considerable amount of arcing had already occurred and the workpiece, or the tool electrode, was damaged, usually irreparably. Indeed, in this prior arrangement an arc condition was only identified after a delay of a number of seconds, sometimes more than five seconds.

Furthermore, an arc condition can arise from several causes and sometimes arc conditions due to only one type of cause could be detected in the prior proposals.

The Applicants have now noted that there is a characteristic of all arc conditions, presently known to them and distinct from machining discharge conditions; namely, the non-occurrence of a high-frequency noise-like component in the gap voltage or current, hereinafter referred to for brevity as an "H.F. component" and further explained below. This H.F. component disappears co-incidentally with the onset of all said arc conditions and it is hence possible to detect the onset of an arc condition within a time of the order or less than ten microseconds, which is often substantially shorter than the normal duration of a machining discharge.

Consequently, if an onset of an arc condition occurs during a machining discharge, this can often be detected during the same discharge.

(A discharge is that which occurs between two successive pause conditions and the term "discharge" may include a discharge with a fault condition present or a good machining discharge. References herein to the "gap" or the "discharge gap" mean the gap between the tool electrode and the workpiece.)

It would be useful therefore to detect a discharge with current flow across the discharge gap coincidental with the absence of a said H.F. component.

However, an alternative fault condition, namely, gap-short circuit, can occur in which this said H.F. component is also absent. This alternative can be detected by various known indications, for example, a drop to zero of gap voltage. The latter could therefore be used as a third-co-incidental condition to differentiate between these two types of fault.

To clarify matters, a table is given below identifying distinguishing characteristics of the five types of conditions usually encountered in electrical discharge machining.

After the table, the relevant H.F. component is defined.

| Instantaneous Condition of Process | H.F. Component herein defined | Gap Volts | Gap Current |
|---|---|---|---|
| Pause (off) | Absent | 0 | 0 |
| Good machining discharge (on) | Present | working | working |
| Arc | Absent | working | working |
| Short-circuit | Absent | 0 | >working e.g. +25% |
| Open-circuit | Absent | full generated voltage | 0 |

The working voltage may be of the order of 30 volts and the full generated voltage of the order of 80–100 volts.

For convenience, we can define the relevant H.F. component as — a high-frequency component of a signal dependent on conditions at the discharge gap, which H.F. component is characteristically present in a machining discharge and characteristically absent in an arc condition.

The matter can be looked at in another way by defining the relevant H.F. component as — a component of a signal depending on conditions at the discharge gap, which H.F. component is at least four times the average repetition frequency of the discharge applied between the tool electrode and the workpiece —; which we believe it to be.

Another way of looking at the matter, is to define the relevant H.F. component as — a component which is of the form of noise above 1 MHz, and more usefully, above 1.5, 2 or even 3 MHz, and also more usefully, below 10 MHz —; which we also believe it to be.

The expression "H.F. component as herein defined" where used in the present description and claims, is intended to refer to one or more of these definitions.

It will be appreciated that the presence or absence of the above mentioned H.F. component could be used in many ways; for example, its presence could be used to detect and count proper machining discharges for measuring efficiency.

Various ways of making use of the H.F. component herein defined are indicated below and in the appended claims, these constituting fields in which patent monopoly is desired.

Broadly stated, according to the present invention there is provided a method of monitoring an electrical discharge machining operation in which the step is taken to detect whether an H.F. component as herein defined is present in the energy discharge across the gap between the tool electrode and the workpiece.

There is also provided according to the invention apparatus which, broadly stated, is for monitoring an electrical discharge machining operation including means for detecting whether an H.F. component as herein defined is present in the energy discharge across the gap between the tool electrode and the workpiece.

This invention also embraces products produced by the method and the apparatus referred to immediately above.

According to one embodiment of the invention there is provided a method of monitoring an electrical discharge machining operation in which method a signal dependent on conditions at the discharge gap is monitored, characterised in that the monitoring is or includes determination of whether an H.F. component as herein defined of the signal is present and which monitoring may include one or more of:
  a. determination of the absence of the H.F. component;
  b. determination of when current is flowing across the gap;
  c. determination of when voltage is applied to the gap;
  d. examination of the H.F. component by use of a high-pass filter;
  e. determination of whether said H.F. component is in excess of 1.0, 1.5 or 2 MHz;
  f. determination of absence of said H.F. component conjointly with co-incidental absence of a short-circuit condition;
  g. distinction between an arc condition and a good machining condition and the other alternative conditions known in electrical discharge machining.

According to a further embodiment of the invention, there is provided a manufacturing or controlling process characterised in that use is made of a monitoring determination as hereinbefore described.

According to another embodiment of the invention there is provided a process in which use is made of the monitoring determination for the purpose of measuring efficiency.

According to yet a further embodiment of the invention there is provided a method of electrical discharge machining characterised in that a monitoring determination made by a method as hereinbefore described, is used to modify an electrical discharge machining operation, and which method may include carrying out one or more of the following steps in response to obtaining a predetermined result of the monitoring, which result may, for example, be taken as indicating an arc condition, namely,
  a. to increase flushing of the discharge gap;
  b. to alter the discharge on/off ratio;
  c. to alter the discharge power;
  d. to interrupt discharges;
  e. to interrupt discharges within 20 microseconds;
  f. to interrupt discharges for less than 0.5 second;
  g. to retract the electrode using a servo-motor which is not a D.C. servo-motor (for example, it is an electro-hydraulic or stepper motor);
  h. to modify the machining operation in an automatic manner, for example, as to any of said steps (a) to (g) above.

According to another embodiment of the invention, there is provided a method as hereinbefore described, characterised in that a monitoring result indicative of an arc condition causes interruption of attempted discharges, detection of a short condition causes substantially shorter interruption of attempted discharges, and the response to detection of a short condition overrides the response to the result indicative of an arc condition, for example, the shorter interruption is for a period of the order of milliseconds, for example, 8 milliseconds.

According to a further embodiment of the invention there is provided a method of checking a procedure, characterised in that the procedure is a method as hereinbefore described, which check may include one or more of the features:
  a. the check forms part of a process or method as hereinbefore described;
  b. the check is carried out automatically and repeatedly;
  c. the check is carried out randomly;;
  d. the check is carried out regularly;
  e. the check is carried out at intervals in the range from 1 second to 5 minutes;
  f. the check is carried out by supplying arc condition simulation signals;
  g. the check is carried out by using logic operations.

A further embodiment of the invention provides a method as hereinbefore described, characterised in that a test is made to determine whether there has been failure to switch off supply of discharge energy to the gap within a predetermined time after an arc condition has been simulated and, if so, to switch off a discharge-pulse generator used in the method.

According to a further embodiment of the invention there is provided a method as hereinbefore described, characterised in that if a monitoring result indicating an arc condition is obtained more frequently than a given value, for example 3 or 5 times in 5 seconds, a signal is issued, said signal serving, for example, to switch off a discharge-pulse generator used in the method, and/or provide an alarm.

According to yet a further embodiment of the invention there is provided apparatus for monitoring an electrical discharge machining operation including means for monitoring a signal dependent on conditions at the discharge gap, characterised in that said means are capable of determining whether an H.F. component as herein defined of said signal is present, the apparatus possibly including one of more of
   a. means for determining the absence of the H.F. component;
   b. means for determining when current is flowing across the gap;
   c. means for determining when voltage is applied to the gap;
   d. means for examining the H.F. component by use of a high-pass filter;
   e. means for determining whether said H.F. component is in excess of 1.0, 1.5 or 2 MHz;
   f. means for determining the absence of said H.F. component conjointly with co-incidental absence of a short-circuit condition;
   g. means for distinguishing between an arc condition and a good machining condition and the other conditions known in electrical discharge machining.

According to a further embodiment of the invention there is provided apparatus as hereinbefore described, characterised in that it includes means for utilizing the monitoring determination to provide a measure of efficiency, for example, by dividing the number of good machining discharges thus monitored by the total number of discharges.

A further embodiment of the invention provides electrical discharge machining apparatus characterised in that it includes monitoring apparatus as hereinbefore described, arranged to modify an electrical discharge machining operation, which apparatus may include means for carrying out one or more of the following steps in response to obtaining a predetermined result of the monitoring, which result may, for example, be taken as indicating an arc condition, namely,
   a. to increase flushing of the discharge gap;
   b. to alter the discharge on/off ratio;
   c. to alter the discharge power;
   d. to interrupt discharges;
   e. to interrupt discharges within 20 microseconds;
   f. to interrupt discharges for less than 0.5 second;
   g. to retract the electrode using a servo-motor which is not a D.C. servo-motor (for example, it is an electro-hydraulic or stepper motor);
   h. to modify the machining operation in an automatic manner, for example, as to any of said steps (a) to (g) above.

According to another embodiment of the invention there is provided apparatus as hereinbefore described, characterised in that it includes means responsive to detection of a monitoring result indicative of an arc condition to cause interruption of discharge pulses and means responsive to a short condition to cause substantially shorter interruption of discharge pulses, the means responsive to a short condition being arranged to override the action of the means responsive to said monitoring result, for example, arranged for the shorter interruption to be for a period of the order of milliseconds, for example, 8 milliseconds.

According to a further embodiment of the invention there is provided a circuit arrangement characterised in that it is for checking that the apparatus as hereinbefore described is correctly operational with respect to monitoring and/or responding to the result of the monitoring.

A further embodiment of the invention provides apparatus as hereinbefore described characterised in that it includes a circuit arrangement to carry out a check of the monitoring function, possibly with one or more of the features:
   a. to carry out the check automatically and repeatedly;
   b. to carry out the check regularly;
   c. to carry out the check randomly;
   d. to carry out the check at intervals in the range from 1 second to 5 minutes;
   e. to supply arc condition simulation signals;
   f. to carry out the check by using logic operations.

According to another embodiment of the invention there is provided apparatus as hereinbefore described, characterised in that it includes a circuit arrangement to determine whether there has been failure to switch off a discharge-pulse generator of the apparatus within a predetermined time after an arc condition has been simulated and, if so, to switch off the generator.

According to yet a further embodiment of the invention there is provided apparatus as hereinbefore described, characterised in that it includes means to produce a signal if a monitoring result indicating an arc condition is detected more frequently than a given value, for example, 3 or 5 times in 5 seconds, and for example, to utilize the signal to switch off a discharge pulse generator of the apparatus and/or provide an alarm.

According to a further embodiment of the invention there is provided a method of machining a workpiece wherein electrical energy is discharged between a tool, for example, a grinding wheel, and a workpiece, and including the step of detecting an H.F. component as herein defined.

According to a further embodiment of the invention there is provided apparatus for machining a workpiece wherein electrical energy is discharged between a tool, for example, a grinding wheel, and a workpiece, the apparatus including means for detecting an H.F. component as herein defined.

A further embodiment of the invention provides an article made by a process which is or includes a method as hereinbefore described or which includes use of apparatus or a circuit arrangement as hereinbefore described.

Reference will now be made by way of example to the accompanying drawings, in which.

Figure 1A:
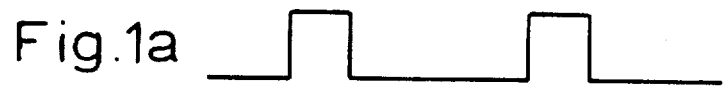
FIGS. 1a, 1b and 1c show respectively typical gap voltage wave forms under open circuit, good machining discharge, and arc conditions. Those skilled in the art will be aware of the corresponding current wave forms.
Figure 1B:
Figure 1C:

Referring to the drawings, the typical gap voltage wave forms of discrete attempted electrical machining discharges across a gap between a tool electrode and a workpiece for varying conditions of operation, are depicted purely diagrammatically in FIGS. 1a, 1b and 1c and show that the voltage across the gap when, as in FIG. 1b, good machining is occurring is less than that which occurs when there is no discharge, that is with an open-circuit condition, as in FIG. 1a, but marginally greater than the voltage which occurs during an arc condition as shown in FIG. 1c.

However, the difference between the voltage under an arc condition and the voltage which occurs under good machining conditions is too small to be a reliable indication of whether good machining is occurring over a wide range of operating conditions which may be required to be employed with any particular apparatus to machine a workpiece as desired.

As explained above, in order to effect the distinction an H.F. component as herein defined in the discharge between the tool electrode and the workpiece, together with the gap current, may be co-incidentally monitored.

Preferably, this is done using a comparator circuit. In order to avoid confusing the arc condition with a short condition, as discussed above, preferably a third co-incident signal from a circuit S, indicating a short condition, is also fed to the comparator circuit C.

Figure 2:
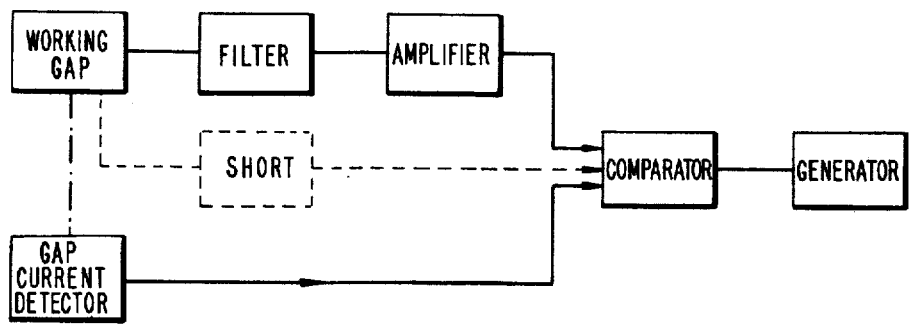
FIG. 2 is a schematic circuit diagram of one apparatus for comparing the voltage at the gap with current at the gap to identify an arc condition.
Figure 3:
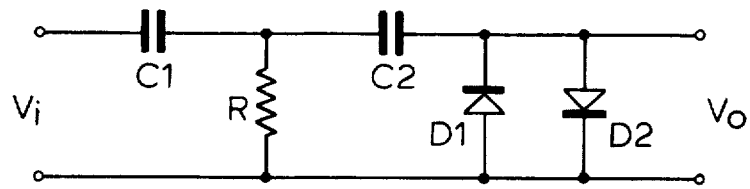
FIG. 3 illustrates a high-pass filter circuit forming part of the schematic circuit of FIG. 2.

In the circuit shown schematically in FIG. 2, the gap voltage or current at W is fed through a high-pass filter circuit F, one example of which is shown in more detail in FIG. 3, and the output of that filter circuit F is amplified by an amplifier circuit A and fed as a first input to a comparator circuit C. It has been found particularly useful for the amplifier A to include a frequency to voltage converter which is saturated by the desired H.F. signal to produce effectively a logic 1 signal. A second input to the comparator circuit O is derived from a gap current detector or measuring device CD. Due to the discrete and individual nature of the discharges, these two inputs to the comparator circuit C comprise a succession of pulses. Conveniently then, the amplifier circuit A for the H.F. component of the gap voltage may be designed to provide a succession of pulses when good machining discharges occur which co-incide with a succession of pulses which effectively constitute the current signal from detector CD.

In this case the comparator circuit C may have an AND function so that its output also comprises a succession of pulses while good machining discharges are occurring. However, as soon as an arc condition is established, no pulses would be supplied to the comparator circuit C from the high-pass filter F so that there would be no output from the comparator circuit C. This zero output can be suitably detected (for example, using a delay or integrating device) and used in any convenient manner, for example to pass a signal to generator G which is then effective to discontinue supply of energy to the gap for a predetermined period.

In an alternative arrangement the input to the comparator circuit C from the amplifier circuit A could comprise a logic 1 signal in the absence of an H.F. component say in excess of 1.5 MHz in the gap voltage or gap current and a logic 0 signal when said H.F. component is present. This may conveniently be produced by logically inverting the above mentioned logic output from circuit A. The current signal from detector CD could as before comprise a logic 1 signal whose start and finish substantially co-incide with those of each discrete machining discharge, and is otherwise logic 0 and the comparator circuit C, again by acting as an AND gate, can be arranged to provide an output only in response to a co-incident input signal at each of its inputs. This arrangement would then give an output from the comparator circuit C only when a burn or arc condition (assuming no other condition is confused therewith, see below) has become established, and such output could be used to control a switching device to cut off the supply of energy to the gap.

Also, a servo system may be operated to cause the tool electrode to be withdrawn.

The short condition may be discounted by applying a third input to the comparator circuit C from a short condition detecting circuit S, which is a logic 0 when there is a short condition and otherwise is a logic 1.

Other logically equivalent circuitry may be used. For example, the logically opposite signals to those just described may be provided in respect of the H.F. component current in the gap and, if it is to be taken into account, a short condition, so producing logic 0 signals at an arc condition, the comparator circuit C then being an OR gate plus inverted output to provide a logic 1 signal to indicate the arc condition.

It will be appreciated that the function of the comparator circuit C can be that of an AND gate, an OR gate, or combinations thereof according to requirements.

The above described control circuit, therefore, provides an indication of an arc condition which enables the machining operation to be controlled or modified so as to terminate such an arc condition substantially immediately, by interrupting the attempted working discharges. The interruption may be 0.5 second which allows the usual servo, when this is not a D.C. servo, to retract the electrode, the retraction itself causing sufficient disturbance in the flushing liquid to enhance flushing to a degree which may clear the cause of the arc condition.

The short condition detector means S will usually be adapted and arranged to cut off the energy supply to the gap when it detects a gap short condition, and the tool electrode may be withdrawn under servo control. If the usually brief response (8 milliseconds) to a short-circuit condition is arranged to override the much lengthier response (0.5 second) to an arc condition, for example, by using one of the methods described above of distinguishing between the two conditions, time-saving is effected which may be requisite in some applications in which, for example, short conditions occur 100 times more frequently than arc conditions.

Indeed, in some circumstances, the control circuit might be selectively switchable to respond in a selected one of three moves upon detecting both gap arc and gap short-circuit conditions and distinguishing between them, namely, (a) to respond differently to them; (b) to respond only to the former; and (c) to respond only to the latter.

This could avoid or complement the use of existing separate control means specifically for detecting gap short condition.

Figure 4A:
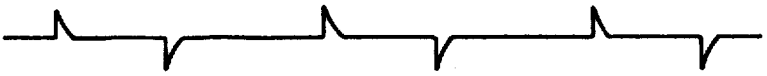
FIGS. 4a, 4b and 4c show respectively the output voltage of the high pass filter circuit of FIG. 3 for the condition of gap voltage on open-circuit, good machining discharge and arc conditions.
Figure 4B:
Figure 4C:

The form of high-pass filter circuit shown by way of example in FIG. 3 is designed with the requisite components and circuit lay-out to block all frequencies below 1.5 MHz, and is provided with a pair of diodes to limit the output voltage to a predetermined maximum, for example, 1 volt, particularly in respect of switch-on spikes (sharp surge pulses) of perhaps 80 volts and switch-off spikes of some tens of volts. In this way the output of the high-pass filter circuit takes the form (said H.F. component) shown in FIG. 4b when good machining discharges are occurring, and the form shown in FIGS. 4a and 4c in the event of open-circuit and arc conditions respectively.

As is evident, the signal passed under these latter two conditions includes only occasional sharp pulses which can be distinguished quite easily, for example, by a voltage limiter plus an integrator or some other delay circuit, from the much longer duration high frequency pulses that are passed when good machining discharges are occurring.

Figure 5:
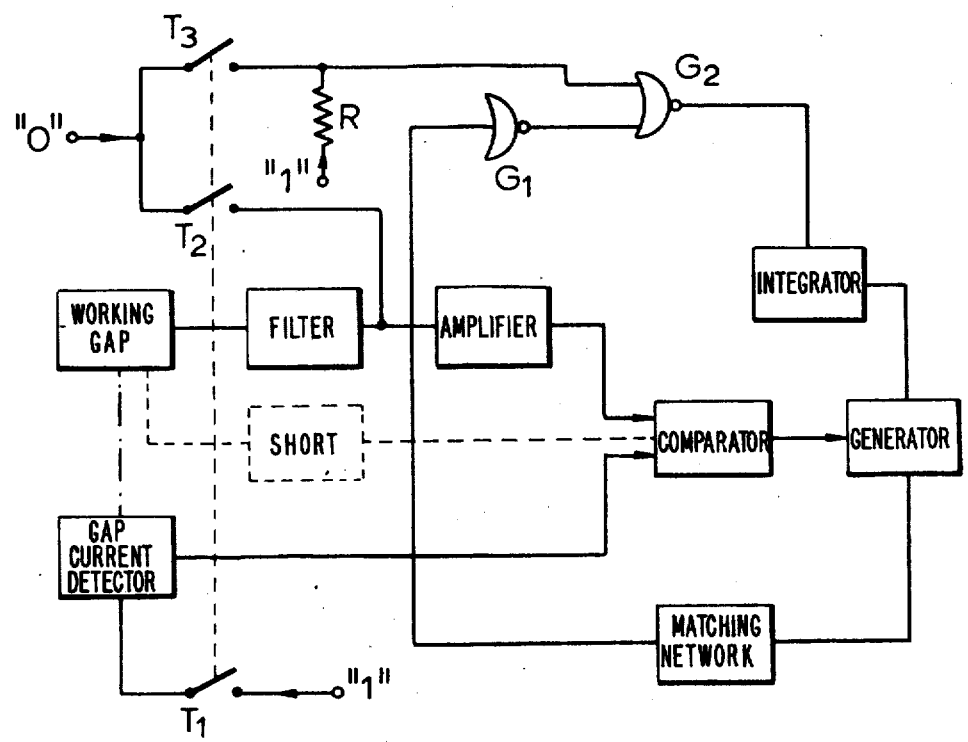
FIG. 5 is a schematic circuit diagram illustrating a development of the embodiment depicted in FIG. 2 in which there is added circuitry for checking that the apparatus for monitoring and reacting to an arc condition is functioning correctly.

In the circuit depicted diagrammatically in FIG. 5, which shows a modification of the embodiment shown in FIG. 2, there is provided a timing device for putting in at ganged contacts $T_1$, $T_2$ and $T_3$, signals simulating the occurrence of an arc condition, more particularly, a 1 condition at $T_1$ and a 0 condition at contact $T_2$. The terms 1 and 0 refer to two suitable distinct logic signal conditions, for example, two voltage levels separated by 12 volts.

When contacts $T_1$ and $T_2$ are closed, the part of the circuit shown in FIG. 2 is supplied with signals equivalent to those that it would detect if there were an arc condition. The circuit should react for example, by switching off energy supply to the gap.

This can be tested by observing whether energy supply to the gap ceases after contacts $T_1$ and $T_2$ have been closed. However, it is preferable to automate the process. For this purpose, a further contact $T_3$ is used. When the generator G attempts to produce a discharge, a corresponding signal is supplied through a matching network M and an inverting gate $G_1$ to a main OR gate $G_2$ with an inverting output.

Normally, the other input of gate $G_2$ is supplied with a 1 signal through the resistor R. When contact $T_3$ is closed, this other input of the gate $G_2$ is supplied with a 0 signal. Thus, if the generator G is still switched on and producing attempted discharges after the test condition has been applied by closing contacts $T_1$, $T_2$ and $T_3$, the 0 signal is present at each input of the gate $G_2$ and the output of that gate supplies a 1 signal to the integrator I. If the energy supply to the gap is not switched off before a predetermined time, the signal 1 is thereby supplied to integrator I for a sufficient time for the integrator to produce an output signal which switches off the generator G. This will be effected at a master switch (not shown) and an alarm is given which may be visual and/or audio. If the components shown in FIG. 2 function correctly, however, energy supply to the gap ceases briefly and then recommences. This may be the normal interruption (somewhat under 0.5 second) assuming an arc condition, but preferably is made much briefer for the purposes of the test by an override component which switches on energy supply to the gap again after only a few milliseconds.

In both FIG. 2 and FIG. 5, in each of the logic units employed, it is preferable to use cosmos circuitry, (explained, for example, in various manuals published by The Radio Corporation of America) because of its high insensitivity to noise (for example, not responding to 6 volts noise but responding to 12 volts signal). If this is used in conjunction with an electromagnetic relay having a plurality of contacts, then it has been found necessary to use a delay device to prevent the cosmos circuitry from reacting before all the contacts of the relay have changed over and falsely indicating an arc condition.

The delay device can conveniently be arranged to provide also the timing function of integrator I.

References above to a tool electrode in embodiments of the invention include a tool in the form of a grinding wheel, between which and a workpiece electrical energy is discharged.

We claim:

1. A circuit for controlling an EDM process in EDM machines having a logical monitoring circuit for detecting a wrong discharge pulse out of the simultaneous occurrence and absence of certain electrical characteristics in the electrical discharge at a discharge gap, said circuit including means for effecting a short interruption of the EDM process, when such wrong discharge pulses occur, the improvement comprising an input-device connected with the circuit for supplying to the monitoring circuit an arbitrary input of test signals which simulate a wrong discharge pulse, to thereby enable checking of the monitoring circuit.

2. A circuit as claimed in claim 1, wherein means is combined with the input device and the logical monitor circuit which produces a warning signal when the test signals are put in and at the same time energy is supplied to the discharge gap.

3. A circuit as claimed in claim 2, wherein a switch is connected with the circuit and said switch is actuated by the warning signal, which switch interrupts the energy supply to the discharge gap.

4. A circuit as claimed in claim 2, wherein an optical display is connected to be actuated by said warning signal.

5. A circuit as claimed in claim 2, wherein an acoustic device is connected to be actuated by said warning signal.

6. A circuit as claimed in claim 2, wherein the monitor circuit comprises an integrator which produces the warning signal in its output when the test signals are put in and the energy supply to the discharge gap is maintained for a certain period of time.

7. A circuit as claimed in claim 1, wherein a signal generator is connected with the circuit to automatically provide the input of the test signals.

8. A circuit as claimed in claim 1, wherein the input device comprises a plurality of ganged switches connected between the monitoring circuit and a source of signals simulating an arc condition at the discharge gap such that when the switches are closed signals simulating an arc condition are supplied to the monitoring circuit.

9. A circuit as claimed in claim 8, wherein a further switch means is connected in the circuit, which when closed, supplies a further signal to the circuit to cause an alarm to be given, and means for closing said further switch means when said ganged switches are closed.

* * * * *